(12) United States Patent
Kurosu

(10) Patent No.: US 6,347,191 B1
(45) Date of Patent: Feb. 12, 2002

(54) SHUTTER CONTROL APPARATUS

(75) Inventor: Tomio Kurosu, Tokyo (JP)

(73) Assignee: Nidec Copal Corporation, Tokyo (JP)

(*) Notice: Subject to any disclaimer, the term of this patent is extended or adjusted under 35 U.S.C. 154(b) by 0 days.

(21) Appl. No.: 09/695,418

(22) Filed: Oct. 25, 2000

(30) Foreign Application Priority Data

Oct. 26, 1999 (JP) .......................................... 11-304250

(51) Int. Cl.$^7$ ............................ G03B 7/26; G03B 7/00; G03B 7/083
(52) U.S. Cl. ...................... 396/221; 396/235; 396/236; 396/247; 396/277
(58) Field of Search ............................... 396/221, 235, 396/246, 247, 277, 303, 279, 213, 301, 236, 463

(56) References Cited

U.S. PATENT DOCUMENTS

| 4,104,666 A | 8/1978 | Toyoda et al. | |
| 4,280,761 A | 7/1981 | Ogawa et al. | |
| 4,763,155 A | * 8/1988 | Oda et al. | 396/235 |
| 5,966,553 A | * 10/1999 | Nishitani et al. | 396/303 |

FOREIGN PATENT DOCUMENTS

| JP | 55-96925 | 7/1980 |
| JP | 55-143545 | 11/1980 |
| JP | 60-254027 | 12/1985 |

* cited by examiner

Primary Examiner—Christopher E. Mahoney
Assistant Examiner—Rochelle Blackman
(74) Attorney, Agent, or Firm—Nixon Peabody LLP; Thomas W. Cole

(57) ABSTRACT

A shutter control apparatus is constructed for executing an exposure operation of a camera to photograph an object by controlling an actuator which drives a shutter blade to be opened and closed. In the shutter control apparatus, a battery supplies a power supply voltage. A detection circuit detects a variation occurring in the power supply voltage. A drive circuit directly uses the power supply voltage to feed a power to the actuator. The drive circuit switches between an open power for opening the shutter blade and a closing power for closing the shutter blade. A control circuit controls the drive circuit by setting a timing for switching to the closing power in accordance with at least a brightness of an object. The control circuit corrects the timing for switching to the closing power in accordance with the variation of the power supply voltage detected by the detection circuit. Practically, the control circuit operates when the power supply voltage lowers along a time for advancing the timing for switching to the closing power so as to compensate for a delay in the closing of the shutter blade due to reduction in the closing power caused by the lowering of the power supply voltage.

7 Claims, 11 Drawing Sheets

| IN CASE OF T=1/200=5ms | | |
|---|---|---|
| POWER SUPPLY VOLTAGE(V) | δT(ms) | TAE(ms) |
| 3.2~3.0 | 2.25 | 2.75 |
| 3.0~2.8 | 2.35 | 2.65 |
| 2.8~2.6 | 2.50 | 2.50 |
| 2.6~2.4 | 2.70 | 2.30 |
| 2.4~2.2 | 2.90 | 2.10 |

SHUTTER CONTROL APPARATUS

BACKGROUND OF THE INVENTION (i) Field of the Invention

The present invention relates to a shutter control apparatus for a camera. More specifically, the present invention relates to a technique for correcting timing for closing a shutter blade in accordance with a variation of a power supply voltage fed from a battery.

(ii) Description of the Related Art

A shutter control apparatus executes the exposure operation of a camera by controlling an actuator for driving a shutter blade to be opened and closed. A conventional shutter control apparatus is basically made up of a drive circuit and a control circuit. Upon receiving supply of a power supply voltage from a battery, the drive circuit switches the power for opening operation and the power for closing operation to be supplied to the actuator. The control circuit sets a timing for switching to the closing operation in accordance with at least brightness information of an object in order to control the drive circuit. The power supply voltage fed from the battery suffers from the downward variation with time. In accordance with this variation, the power supplied from the drive circuit to the actuator is reduced, which delays the shutter operation. When the shutter operation is delayed, the overexposure occurs. In order to eliminate instability of the shutter operation due to such a variation of the power supply voltage, a technique for feeding the power to the drive circuit through a constant voltage circuit or a constant current circuit has been proposed, and it is disclosed in, for example, U.S. Pat. No. 4,104,666 (Japanese patent application laid-open No. 60618-1977) and U.S. Pat. No. 4,280,761 (Japanese patent application laid-open No. 58010-1986).

FIG. 11 is a block diagram showing an example of a prior art shutter control apparatus. The shutter control apparatus 100 executes the exposure operation of a camera by controlling a shutter motor 101 for driving a shutter blade (not shown) to be opened and closed, and includes a constant voltage circuit 107 in addition to a drive circuit 104 and a control circuit 105. The drive circuit 104 performs switching between the power for opening drive and the power for closing drive to be supplied to the shutter motor 101. The control circuit 105 sets a timing for switching to the closing drive in accordance with at least brightness information of an object in order to control the drive circuit 104. The constant voltage circuit 107 turns the power supply voltage fed from a battery 102 into a constant voltage to be supplied to the drive circuit 104 so that the operation of the drive circuit 104 is stabilized.

Providing the constant voltage circuit 107, however, causes another drawback. In general, a stabilized voltage (constant voltage) outputted from the constant voltage circuit 107 is set in accordance with the lowest level of the power supply voltage of the battery 102 in an allowable range. Therefore, the power supply voltage maintained at a high level and a medium level over the better part of life duration of the battery is forcibly lowered by the constant voltage circuit 107, and the power supply voltage is disadvantageously utilized in the lowest level. Thus, there is such a problem as that the utilization efficiency of the power supply voltage is poor. In addition, the circuit for stabilizing the power supply voltage has the inferior efficiency in terms of cost and space. For example, the voltage from the battery 102 fluctuates from 3.2 V at the maximum level to 2.2 V at the minimum level, and an average level is approximately 2.7 V. On the other hand, since the constant voltage circuit 107 attains stabilization of the power supply voltage with the minimum voltage of 2.2 V as a reference, the output voltage is approximately 1.6 V. The reduced amount of 2.2 V−1.6 V=0.6 V is a loss caused by the constant voltage circuit 107. The constant voltage of 1.6 V is supplied to the drive circuit 104, and 1.2 V which is obtained by subtracting another loss amount 0.4 V from the constant voltage is applied to the shutter motor 101. Therefore, the power supply voltage of 2.7 V is reduced to 1.2 V on the average and this obtained voltage is supplied to the actuator. A total loss is up to 2.7 V−1.2 V=1.5 V.

FIG. 12 is a typical block diagram showing another example of the conventional shutter control apparatus. Like reference numerals denote parts corresponding to those in the prior art illustrated in FIG. 11. The prior art shown in FIG. 11 uses the constant voltage circuit for stabilizing the power supply, whereas the prior art depicted in FIG. 12 uses the constant current circuit. As shown in the drawing, the drive circuit 104 is a bridge circuit consisting of four transistors Tr1 to Tr4. Switching these transistors by a control circuit 105 controls a direction of an electric current for energizing the shutter motor 101. Consequently, the shutter motor 101 rotates in the forward direction at the time of opening drive and rotates in the reverse direction at the time of closing drive. The constant current circuit for stabilizing the drive current supplied from the battery 102 to the drive circuit 104 is constituted by a current source I, a load resistance R, a pair of operational amplifiers A and four buffers B, and stabilizes the drive current flowing the shutter motor 101 through the drive circuit 104. In this case, assuming that the loss of each transistor is 0.2V, the loss caused by the drive circuit 104 is 2×0.2 V=0.4 V and the loss caused by the constant current circuit is approximately 0.6 V. Therefore, the voltage applied to the ends of the shutter motor 101 is approximately 1.2 V, which is greatly reduced as compared with the power supply voltage of the battery 102. Incidentally, although a dynamic stabilization technique for performing the feedback control over the drive current by monitoring a rotational speed of the shutter motor has been proposed instead of static stabilization using the constant current circuit, the effect is not enough since the margin of the control voltage is small when the high-speed feedback characteristic is demanded. Such a technique is disclosed in, e.g., Japanese patent application laid-open No. 96925-1980, Japanese patent application laid-open No. 143545-1980 (U.S. Pat. No. 4,322,145), Japanese patent application laid-open No. 254027-1985 (U.S. Pat. No. 4,648,701), and U.S. Pat. No. 4,763,155 (Japanese patent No. 2608705).

SUMMARY OF THE INVENTION

In order to eliminate the above-described problems in the prior art, the following means is taken. That is, the present invention provides a shutter control apparatus for executing an exposure operation of a camera to photograph an object by controlling an actuator which drives a shutter blade to be opened and closed. The shutter control apparatus comprises a battery that supplies a power supply voltage, a detection circuit for detecting a variation occurring in the power supply voltage, a drive circuit that directly uses the power supply voltage to feed a power to the actuator, the drive circuit switching between an open power for opening the shutter blade and a closing power for closing the shutter blade, and a control circuit that controls the drive circuit by setting a timing for switching to the closing power in accordance with at least a brightness of an object, wherein the control circuit corrects the timing for switching to the closing power in accordance with the variation of the power supply voltage detected by the detection circuit.

Preferably, the control circuit operates when the power supply voltage lowers along a time for advancing the timing for switching to the closing power so as to compensate for a delay in the closing of the shutter blade due to reduction in the closing power caused by the lowering of the power supply voltage.

Preferably, the detection circuit detects the variation of the power supply voltage while the actuator is energized by the drive circuit before executing of the exposure operation.

Preferably, the control circuit controls the actuator for driving the shutter blade provided in a digital still camera.

According to the present invention, the power supply voltage fed from the battery is directly supplied to the drive circuit without using the constant voltage circuit or the constant current circuit. This prevents loss of the power supply voltage and attains improvement of the power utilization efficiency. For example, when the power supply voltage is 2.7 V which is the average level, the voltage applied to the actuator corresponds to the value obtained by subtracting the loss of 0.4 V caused by the drive circuit from the power supply voltage, and it is calculated as 2.3 V. Further, when the power supply voltage is reduced to 2.2 V which is the lowest level, the drive voltage is 2.2 V–0.4 V=1.8 V. On the other hand, in the prior art shutter control apparatus incorporating therein the constant voltage circuit or the constant current circuit, the net drive voltage applied to the actuator is 1.2 V irrespective of the power supply voltage of the battery. Therefore, according to the present invention, the utilization efficiency of the power supply voltage is improved 50% to 100% as compared with the prior art. When directly feeding the power to the drive circuit by the battery, however, the operation becomes unstable due to a variation in the power supply voltage. Therefore, in the present invention, stabilization is achieved by correcting the timing for switching to the closing drive in accordance with a variation in the power supply voltage detected by the detection circuit. Specifically, the correction is made so as to advance the timing for switching to the closing drive in order to cancel out the delay of the shutter operation caused due to reduction in the drive power generated when the power supply voltage suffers from the downward variation with time. With the above described measure, increase in efficiency of power supply and stabilization of the shutter control apparatus can be both achieved.

DETAILED DESCRIPTION OF THE PREFERRED EMBODIMENTS

Figure 1:
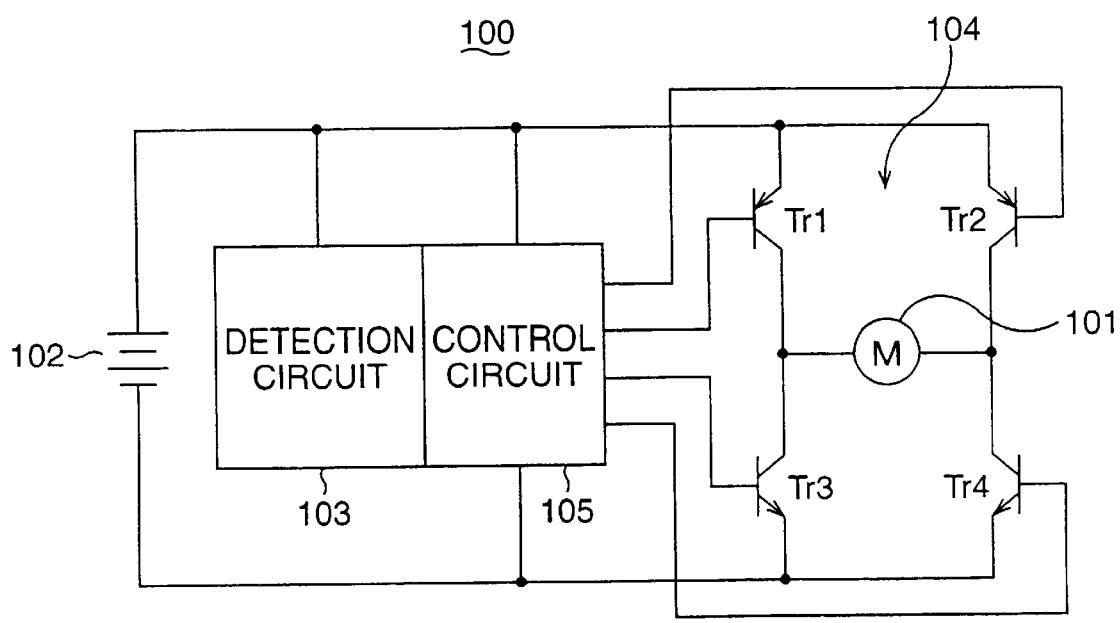
FIG. 1 is a block diagram showing an entire structure of a shutter control apparatus according to the present invention.

An embodiment of the present invention will now be described in detail hereinafter with reference to the accompanying drawings. FIG. 1 is a block diagram showing the entire structure of a shutter control apparatus according to the present invention. As shown in the drawing, a shutter control apparatus 100 executes the exposure operation of a camera by controlling a motor 101 for driving a shutter blade (not shown) to be opened and closed. It is to be noted that various kinds of actuators such as a DC motor can be adopted as the motor 101 for driving the shutter blade to be opened and closed. The shutter control apparatus 100 is basically constituted by a battery 102, a detection circuit 103, a drive circuit 104 and a control circuit 105. The battery 102 supplies a power supply voltage which fluctuates from the maximum voltage of 3.2 V to the minimum voltage of 2.2 V. The detection circuit 103 detects a variation in the power supply voltage of the battery 102. The drive circuit 104 has a bridge structure including four transistors Tr1 to Tr4. The drive circuit 104 directly uses the power supply voltage, and performs switching between the power for opening drive and the power for closing drive to be supplied to the motor 101. Specifically, in the opening drive, Tr1 and Tr4 are turned on to rotate the motor 1 in the forward direction. In the closing drive, Tr2 and Tr3 are turned on to rotate the motor 101 in the reverse direction. The base potential of the four transistors Tr1 to Tr4 is controlled by the control circuit 105 in order to turn on/off these transistors. It is to be noted that the control circuit 105 is constituted by a microprocessor including a CPU. The control circuit 105 sets a timing for switching to the closing drive in accordance with at least brightness information of an object to control the drive circuit 104. Consequently, the appropriate brightness exposure operation can be executed in accordance with the brightness of an object to be photographed.

As a characteristic aspect of the present invention, the control circuit 105 corrects the timing for switching to the closing drive in accordance with a variation in the power supply voltage detected by the detection circuit 103. Specifically, the control circuit 105 performs correction so as to advance the timing for switching to the closing drive in order to cancel out the delay of the shutter operation caused due to reduction in the drive power generated as the power supply voltage suffers from the downward variation with time. Preferably, the detection circuit 103 detects a variation in the power supply voltage while the motor 101 is energized through the drive circuit 104 before executing the exposure operation. In other words, the detection circuit 103 carries out the battery check using the actual loading (for example, energization in the reverse rotation direction with respect to the shutter motor) immediately before the shutter operation. It is to be noted that further correction according to a change in an ambient temperature may be effected in addition to the correction according to the variation in the power supply voltage in some cases. In such a case, a temperature sensor is arranged in the vicinity of the shutter motor 101, and the timing for switching to the closing drive is corrected in accordance with the detection result. In general, since a resistance value of a coil constituting the motor 101 changes when an ambient temperature varies, the drive current flowing through the motor 101 fluctuates. In order to cancel out this variation, it is effective to correct the timing for switching to the closing drive.

The operation of the shutter control apparatus shown in FIG. 1 will now be described with reference to FIG. 2. As shown in the drawing, the drive waveform of the shutter motor contains a pulse with a positive polarity, and the opening drive for the shutter drive is performed. At this time, H indicates the maximum level; M, the normal level; and L, the minimum level. Subsequently, the drive waveform changes to the negative polarity and the closing drive for the shutter blade is carried out after elapse of a control time TAE which is set in accordance with brightness information of an object in advance. That is, the control time TAE represents the timing for switching to the closing drive. At this time, the voltage level of the drive waveform changes as H, M and L with respect to the ground potential GND in accordance with a variation of the power supply voltage. The shutter blade travels in conformity to the illustrated shutter aperture trajectory in accordance with a change of such a drive waveform. The opening drive is first carried out and the shutter blade passes a pin hole level and the aperture is gradually opened. Thereafter, the operation changes to the closing drive and the lens aperture is then closed. A part with hatching in the shutter aperture trajectory represents an amount of exposure which is determined by the control time TAE. In fact, however, since the operation of the shutter blade is delayed when the power supply voltage is at the minimum level L, the closing timing is shifted rearwards, which results in the overexposure. On the contrary, when the power supply voltage is at the maximum level H, the closing timing for the shutter blade is shifted forwards, which results in the underexposure. That is, if the control time TAE is set in accordance with the intermediate level M in advance, the overexposure or underexposure occurs when the power supply voltage fluctuates. It is to be noted that an aperture sensor is incorporated in the shutter control apparatus in order to detect the shutter aperture trajectory. When the shutter aperture trajectory passes the pin hole level and the lens apertures opens, an output from the aperture sensor rises from Low to High. In accordance with this rising, counting of the control time TAE is started, and the drive waveform is changed from the positive polarity to the negative polarity upon completion of the counting.

As described above, after setting the control time TAE, the overexposure or underexposure would occur if no measurement is taken to cope with a variation in the power supply voltage. In the present invention, therefore, the control circuit corrects the control time TAE in accordance with a variation in the power supply voltage detected by the detection circuit. Specifically, when the power supply voltage is at the minimum level L, the control time TAE is corrected to be shorter so that the overexposure is canceled out. On the contrary, when the power supply voltage is at the maximum level H, the control time TAE is corrected to be longer so that the underexposure is canceled out. The closing operation of the shutter blade is affected by the dynamic characteristic of the motor, and significantly varies depending on the drive voltage. When the power supply voltage is at the H level, the motor power is increased to raise the response speed. On the other hand, when the power supply voltage is at the L level, the motor power is decreased to slow down the response speed. That is, the overexposure occurs at the L level while the underexposure occurs at the H level.

Figure 2:
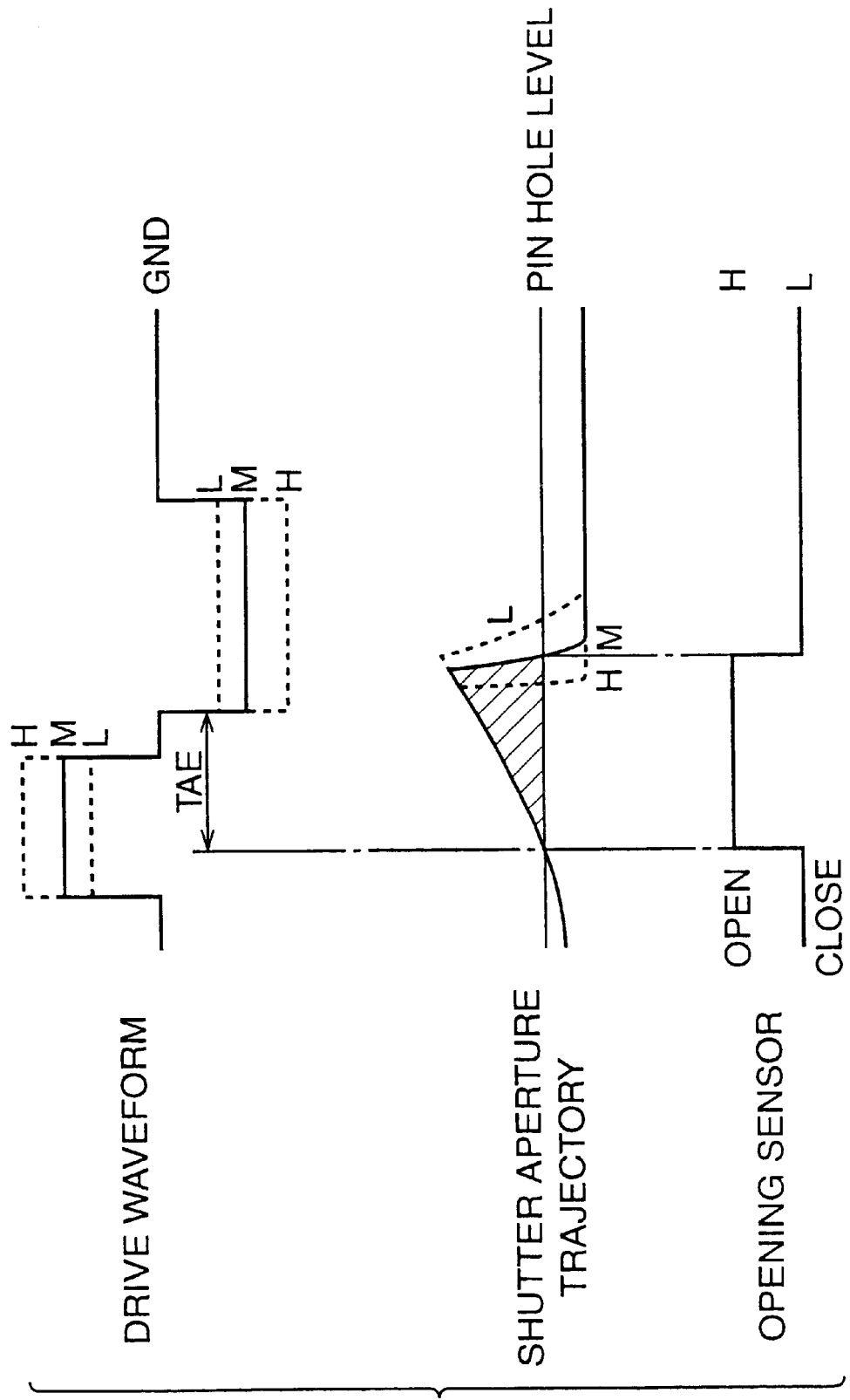
FIG. 2 is a waveform diagram for explaining the operation of the shutter control apparatus according to the present invention.

The shutter control apparatus described in FIG. 2 is an example incorporated in a camera utilizing a usual silver film. However, the present invention is not restricted thereto, and it can be applied to the shutter control apparatus of a digital still camera. The digital still camera uses a CCD for an imaging device instead of the silver film. The exposure operation is electrically started by charge-on of the CCD and finished by the mechanical closing operation of the shutter blade. In this manner, the digital still camera performs the exposure control by a combination of the electrical shutter and the mechanical shutter. The CCD typically has the high sensitivity and the rigorous exposure accuracy that is required. Further, the narrow aperture is difficult because of its structure, and the shutter speed must be increased. In this case, when the constant voltage circuit or the constant current circuit is incorporated to attain stabilization of the power supply voltage, the utilization efficiency of the power supply is deteriorated all the more, and increase in the shutter speed is avoided. Therefore, in the present invention, the utilization efficiency of the power supply voltage is enhanced to increase the shutter speed. At this time, realization of the high accuracy of the shutter operation is guaranteed by performing correction with respect to a variation in the power supply voltage.

Figure 3A:
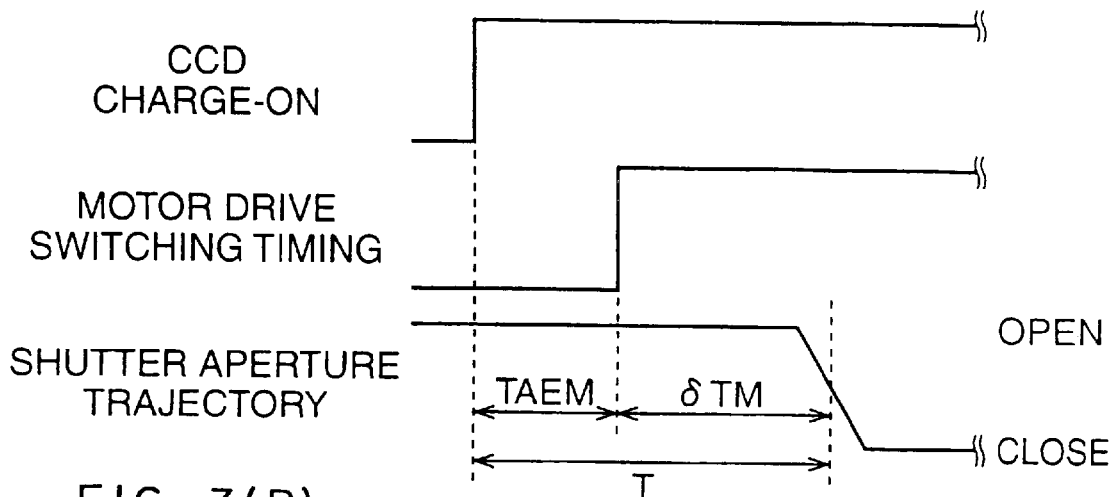
FIGS. 3(A)–(C) are timing charts for explaining the operation.
Figure 3B:
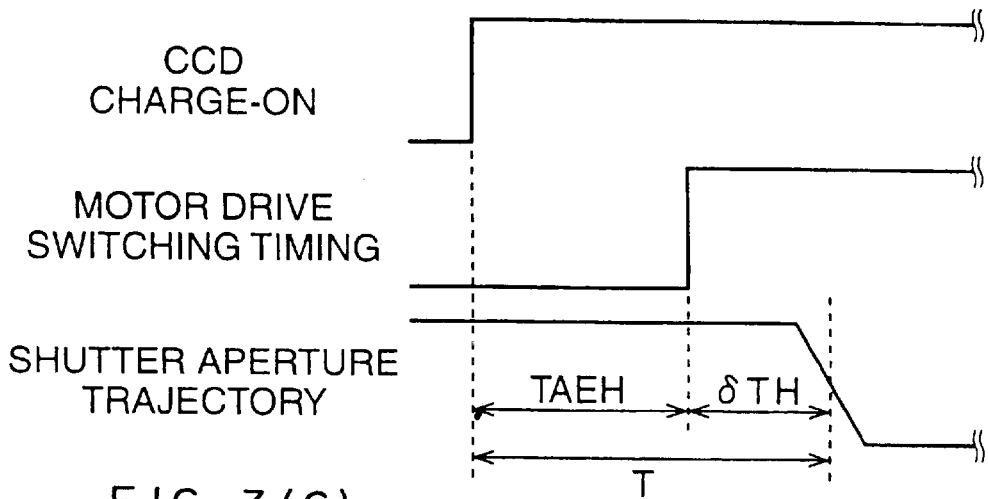
Figure 3C:
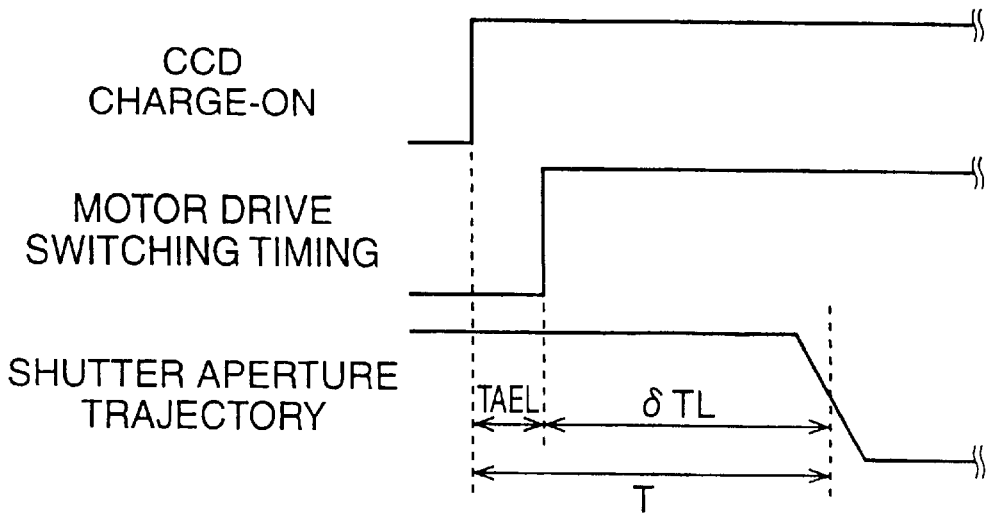

FIGS. 3(A)–(C) are a typical diagram for explaining the operation with cases where the shutter control apparatus illustrated in FIG. 1 is applied to the digital still camera. FIG. (A) is a timing chart showing the operation when the power supply voltage of the battery is at the average M level. In the drawing, T represents an exposure time determined in accordance with the brightness of an object. Further, $\delta$TM represents a mechanical delay time from the switching of the drive power supplied to the motor to an actual closing of the shutter blade. TAEM represents a control time and calculated from an expression TAEM=T–$\delta$TM. As shown in the drawing, counting of the control time TAEM is stared as charge-on of the CCD commences. The motor is switched to the closing drive upon completion of counting. Thereafter, the shutter blade is actually closed after elapse of the mechanical delay time $\delta$TM. With the above-described operation, the shutter control apparatus can perform the exposure operation in accordance with the exposure time T which is previously determined based on the brightness of an object.

FIG. 3(B) shows the operation in cases where the power supply voltage is at the H level. At this time, since the mechanical delay time $\delta$TH is shorter than $\delta$TM, the control time TAEH becomes thereby longer than TAEM. Counting of TAEH is started in synchronization with charge-on of the CCD, and the motor is switched to the closing drive upon completion of counting. Thereafter, the delay time $\delta$TH lapses and the shutter is actually closed. The exposure time T can be stabilized by setting TAEH longer in compensation for shortness of $\delta$TH.

On the contrary, FIG. 3(C) shows the operation in cases where the power supply voltage of the battery is at the L level. In such a case, since the mechanical delay time $\delta$TL is longer, the control time TAEL is thereby set shorter so that a sum of both the times TAEL and $\delta$TL equals to the set exposure time T.

Figure 4:
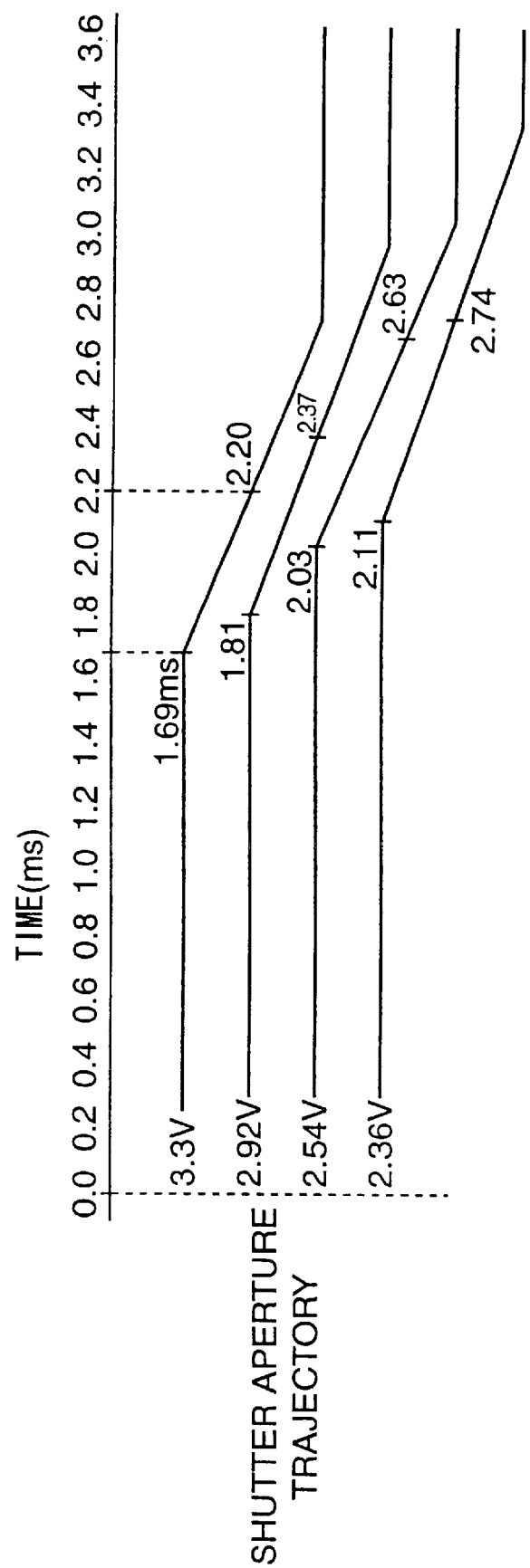
FIG. 4 is a graph showing actual measurement data of a mechanical delay time of a shutter blade.

FIG. 4 is a graph showing data obtained by actually measuring the mechanical delay time of the shutter. If the power supply voltage is 3.3 V, the shutter blade actually starts to close when 1.6 ms passes after the motor drive waveform is switched to the reverse rotation. Further, the lens aperture is closed by half after 2.20 ms, and the lens is thereafter completely closed. In general, since the mechanical delay time is represented by the time until a half of the lens aperture is closed, the delay time is measured as 2.20 ms if the power supply voltage is 3.3 V. Similarly, if the power supply voltage is 2.92 V, the shutter blade starts to close when 1.81 ms passes after the motor drive waveform is switched, and the lens aperture is closed by half after 2.37 ms. Thereafter, the lens aperture is completely closed. Therefore, the mechanical delay time is 2.37 ms. Similarly, if the power supply voltage is 2.54 V, the mechanical delay time is 2.63 ms. If the power supply voltage is 2.36 V, the delay time is 2.74 ms. As described above, the delay time becomes longer as the power supply voltage is lowered.

Figures 5, 6:
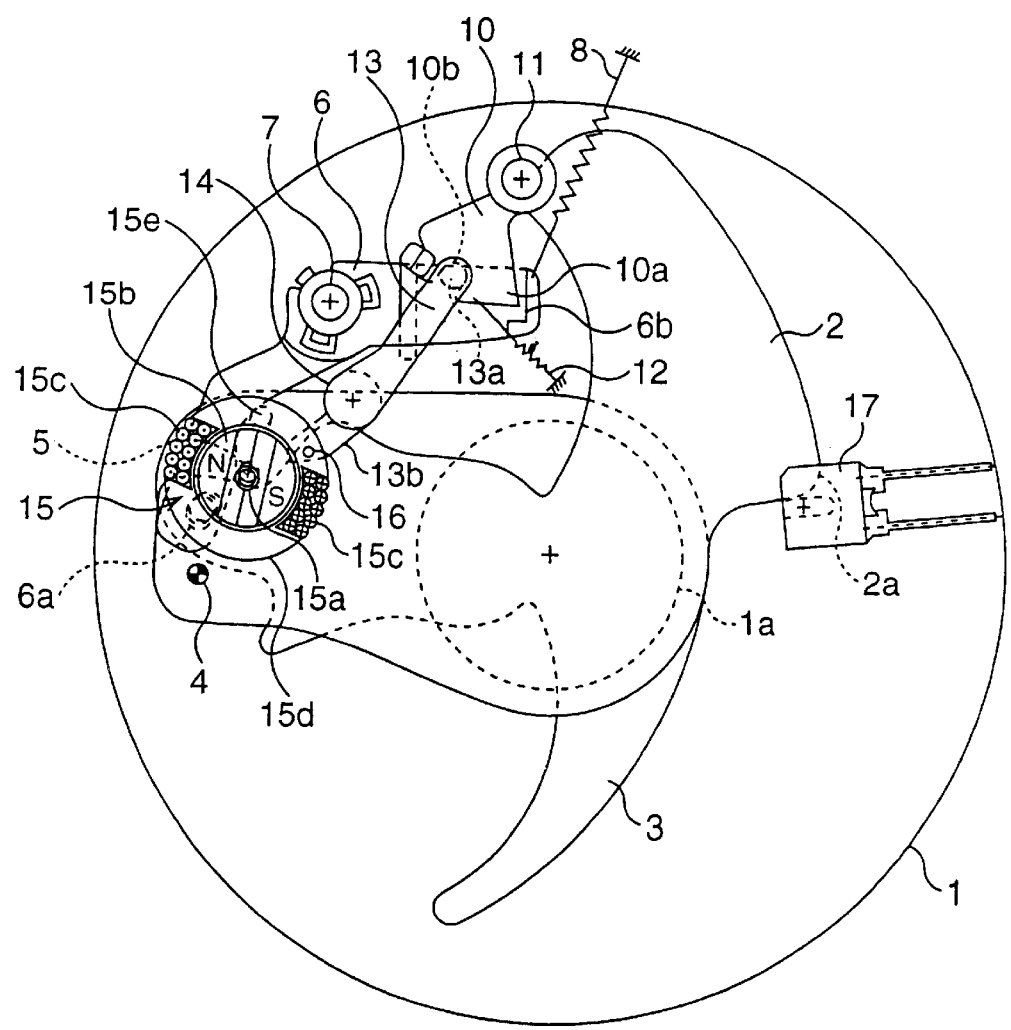
FIG. 5 is a table showing the relationship between a power supply voltage and a control time.
FIG. 6 is a plan view showing a specific example of a shutter controlled by the shutter control apparatus according to the present invention.

FIG. 5 is a table showing the relationship between the power supply voltage, the delay time δT and the control time TAE. This table shows the case where the exposure time T=1/200=5 ms is set. As shown in FIG. 4, if the power supply voltage is 3.2 to 3.0 V, the delay time is 2.25 ms. In this case, in order to realize the set exposure time T=5 ms, the control time should be set as TAE=T−δT=2.75 ms. Similarly, if the power supply voltage is 3.0 to 2.8 V, the delay time δT is 2.35 ms, and the control time TAE is 2.65 ms. In the similar manner, if the power supply voltage is 2.8 to 2.6 V, the control time TAE is 2.50 ms; if the power supply voltage is 2.6 to 2.4 V, TAE is 2.30 ms; and if the power supply voltage is 2.4 to 2.2 V, TAE is 2.10 ms. The table shown in FIG. 5 is stored in a ROM of the shutter control apparatus in advance, and the control circuit including the CPU determines the control time TAE by occasionally making reference to the table stored in the ROM based on the detected power supply voltage. This table is created for each value of the exposure time T and stored in the ROM.

Figure 7:
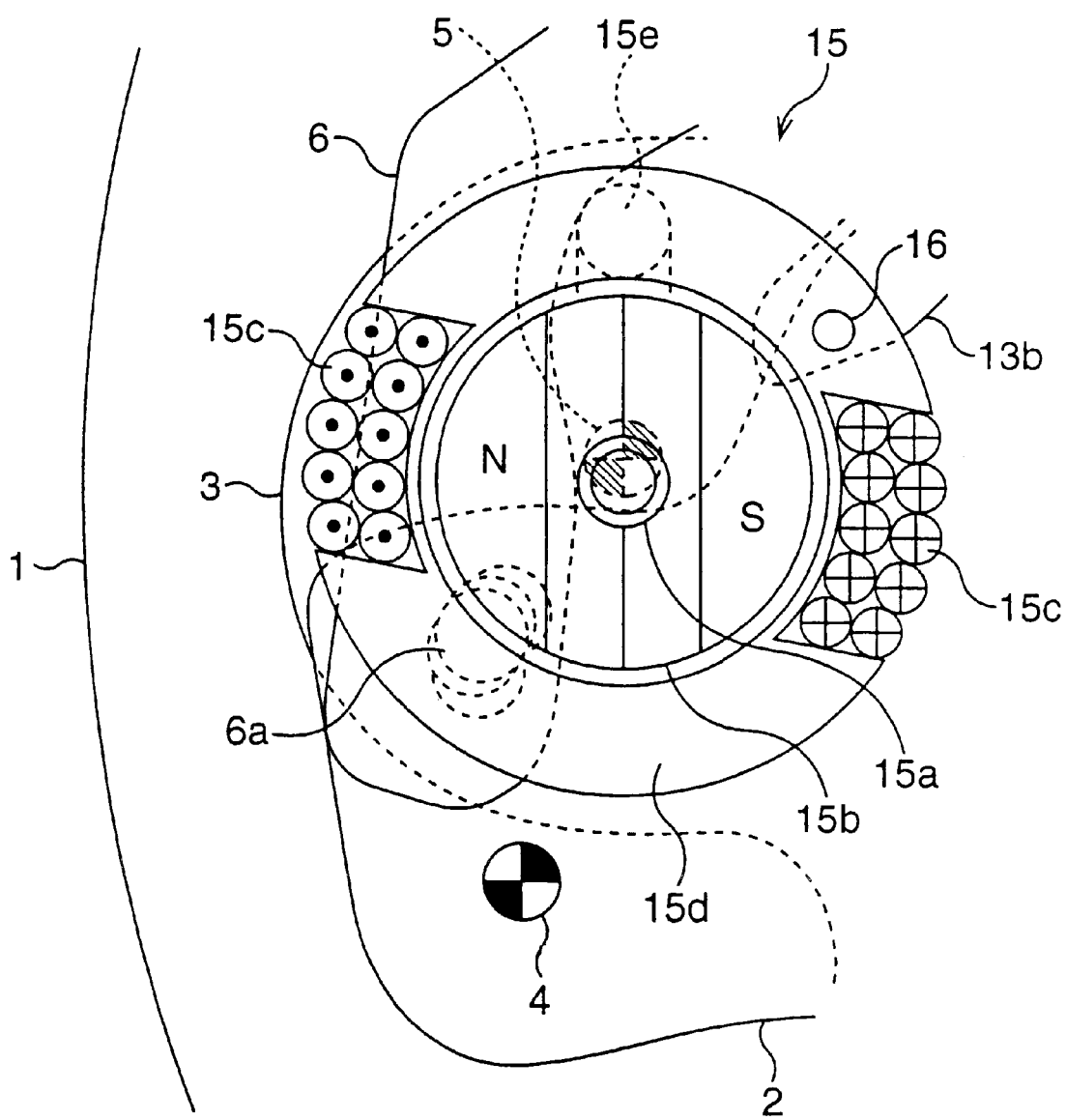
FIG. 7 is a plan view showing a specific structure of a motor for driving the shutter blade.
Figure 8:
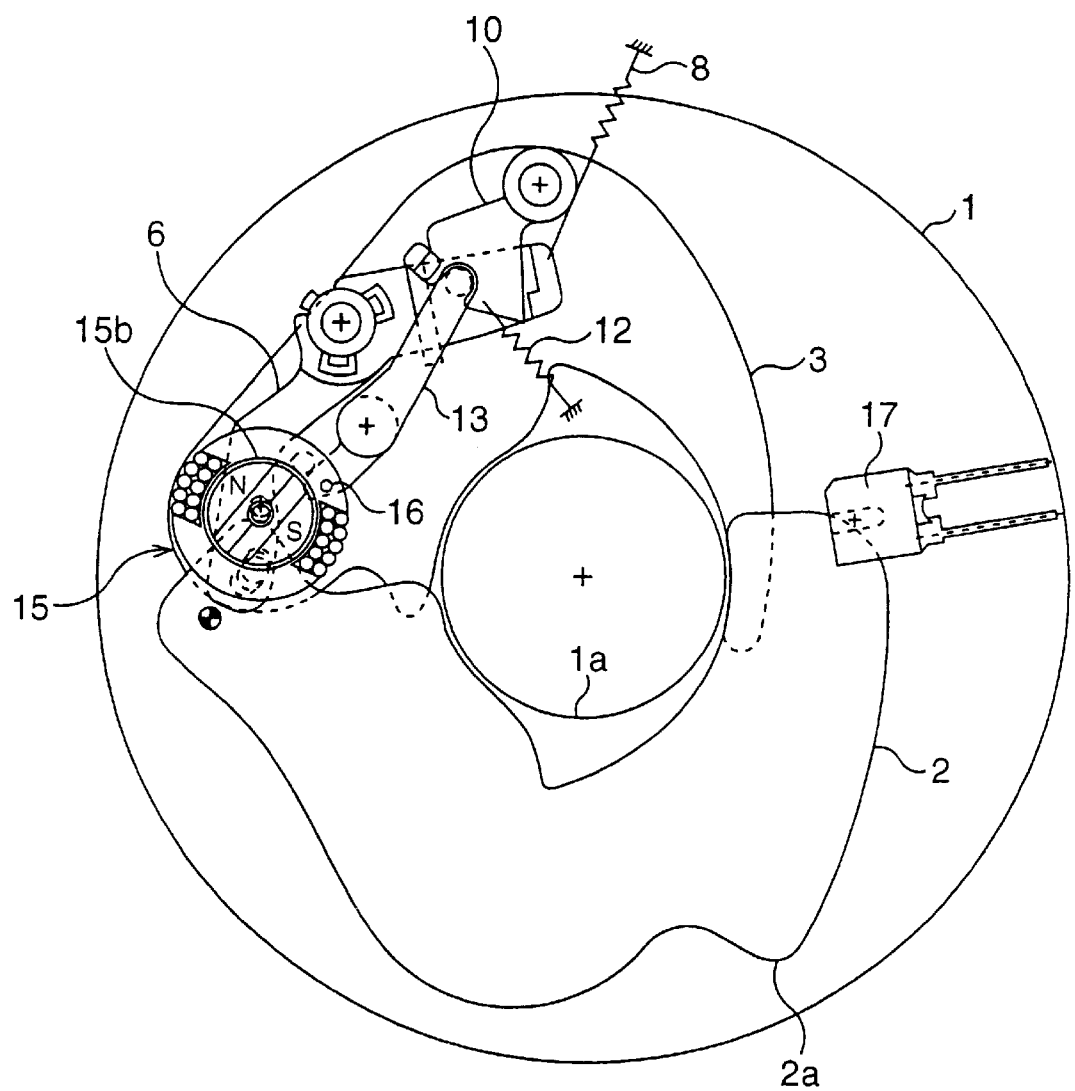
FIG. 8 is a plan view showing the shutter.

At last, a specific example of the structure of a shutter for a camera driven by the shutter control apparatus according to the present invention will now be described with reference to FIGS. 6 to 10. FIG. 6 is a schematic front view of a shutter blade opening/closing mechanism in the state that the blade is closed; FIG. 7, an enlarged plan view showing the structure of the motor; and FIG. 8, a schematic plan view of the shutter blade opening/closing mechanism in the state that the blade is opened. In the drawings, reference numeral 1 denotes a shutter substrate having an exposure aperture 1a formed in the center thereof; 2 and 3, a pair of shutter blades which are pivoted by respective support shafts 4 and 5 to open/close the exposure aperture 1a; 6, an opening/closing lever capable of pivoting, which has at one end thereof a pin 6a to be engaged with respective long holes of the blades 2 and 3 by pin-slot coupling, and which has an engagement concave portion 6b formed at the other end; and 7, a shaft which is fixed to the shutter substrate 1 and holds the center of the opening/closing lever 6 so as to be capable of pivoting. In the drawings, rotation of the opening/closing lever 6 to the right (clockwise rotation) operates the blades 2 and 3 to be closed, and rotation of the same to the left (counterclockwise rotation) operates blades 2 and 3 to be opened. Reference numeral 8 designates an opening spring for imparting a bias to the opening/closing lever 6 in the opening direction.

Reference numeral 10 denotes an engagement lever which is pivoted by a shaft 11 on the shutter substrate 1, and has an engagement portion 10a engaging with the engagement concave portion 6b to cause the opening/closing lever 6 to be engaged and fixed at the blade closing position, and a fork portion 10b; 12, an engagement spring for imparting a bias force to the engagement lever 10 in the left turn direction, i.e., the direction for engaging the opening/closing lever; and 13, a coupling lever which is held by a shaft 14 on a non-illustrated board so as to be capable of pivoting, and which has at one end thereof a pin 13a fitted to the fork portion 10b and at the other end an arm portion 13b.

Reference numeral 15 designates a motor capable of rotating in the forward and reverse directions, which includes therein a rotor magnet 15b having a shaft 15a in the center and a stator 15d around which a coil 15c is wound. A drive pin 15e which rotates integrally with the rotor magnet 15b is constituted so as to protrude to the outside of the motor, and the drive pin 15e is positioned between the opening/closing lever 6 and the arm portion 13b of the coupling lever 13.

When the rotor 15b turns clockwise during energization of the motor 15, the drive pin 15e pushes the arm portion 13b of the coupling lever 13 so that the arm portion 13b turns counterclockwise. As a result, the engagement lever 10 is swiveled to release engagement of the opening/closing lever 6. Further, when the rotor 15b turns counterclockwise, the drive pin 15e pushes the side of the opening/closing lever 6 set at the blade opening position so that the opening/closing lever 6 turns clockwise.

Reference numeral 17 designates a photo sensor arranged on the shutter substrate 1 so as to be turned on/off when the shutter blade 2 passes an outer peripheral edge 2a. The photo sensor 17 is turned off in the blade closing state (FIG. 6) that the shutter blade 2 closes the exposure aperture 1a, and is turned on at a trigger point (pin hole level) when the shutter blade starts operation after commencing the exposure operation. That is, assuming that the point at which the shutter blade 2 turns on the photo sensor 17 is a trigger point after commencing the exposure operation, counting of the exposure time is started, and the motor 15 is rotated in the reverse direction when the set exposure time lapses.

In the motor 15, reference numeral 16 denotes a soft magnetic body consisting of an iron pin positioned in the stator 15d in the vicinity of the coil 15c. The magnetic attractive force of the soft magnetic body 16, which acts between the soft magnetic body 16 and the rotor magnet 15b, is set to a magnitude which is greater than the elastic force of the opening spring 8 but smaller than the turning force of the motor in the forward and reverse direction when the motor is energized. Therefore, when the motor 15 is not energized, the rotor 15b is held in the state slightly shifted from the stop position to the counterclockwise turning direction in case of no magnetic body 16 by the magnetic attractive force between the rotor 15b and the magnetic body 16.

Therefore, when the motor 15 is not energized and there is no magnetic body 16, the drive pin 15e is in contact with the opening/closing lever 6 at a position where it is engaged with the engagement lever 10. In this embodiment, however, the opening/closing lever 6 is pushed to a position where the opening/closing lever 6 is turned in the clockwise direction slightly distanced from the engagement lever 10 (see FIG. 6).

Since this embodiment has the above-described configuration, when the motor 15 is not energized in the blade closing state, the rotor 15b is slightly turned in the counterclockwise direction against the bias force of the opening spring 8 by the magnetic force of the magnetic body 16. Therefore, the opening/closing lever 6 is pushed by the drive pin 15e to be held at a position slightly distanced from the stop position of the engagement lever 10 in the clockwise turning direction, i.e., the blade closing direction (see FIG. 6). Thus, even if the engagement lever 10 is moved in the clockwise turning direction, i.e., the direction away from the opening/closing lever 6 due to, e.g., the impact shock, the opening/closing lever 6 is held at that position by the attractive force of the magnetic body 16. Further, the rotor 15b of the motor 15 does not rotate accidentally by the impact shock and the like.

In case of operating to open the shutter blade in order to take a photograph, when the current flows through the coil 15c of the motor 15 from the rear face of the drawing to the top face of the same (see FIG. 7), the rotor 15b turns in the clockwise direction against the attractive force of the magnetic body 16 in accordance with the Fleming's left-hand rule, and the drive pin 15e slightly swivels in the same direction. Therefore, application of the pushing force to the opening/closing lever 6 is canceled, and the opening/closing lever 6 turns in the counterclockwise direction by the bias force of the opening spring 8. As a result, the engagement concave portion 6b is brought into contact with the engagement portion 10a of the engagement lever 10 to enter the engagement state.

Moreover, the rotor 15b is further turned in the clockwise direction by energization, and the drive pin 15e pushes the coupling lever 13 to be turned in the counterclockwise direction. Then, the engagement lever 10 interlocks via the pin 13a to be turned in the clockwise direction. Consequently, since the opening/closing lever 6 which is free from engagement is turned in the counterclockwise direction by the bias force of the opening spring 8, the blades 2 and 3 are operated to open to the position shown in FIG. 8. It is to be noted that the magnetic force of the magnetic body 16 does not act as a reactive force with respect to the opening operation of the blades in any way in the blade opening operation.

Additionally, when the shutter blade is operated to close from the blade opening state, reversing the energization direction relative to the motor 15 causes the rotor 15b to turn in the counterclockwise direction, and the drive pin 15e pushes the opening/closing lever 6 set in the opening position so that the opening/closing lever 6 turns in the clockwise direction. Further, the engagement lever 10 is closed through the coupling lever 13 in accordance with swiveling of the drive pin 15e, and turns in the counterclockwise direction by the bias force of the closing spring 12.

As a result, when the blade reaches the closing position, energization to the motor 15 is shut off, and the opening/closing lever 6 is engaged with the engagement lever 10. The opening/closing lever 6 is, however, further turned in the clockwise direction by the magnetic force of the magnetic body 16 as described above and held at a position slightly distanced from the engagement lever 10 in the clockwise turning direction as shown in FIG. 1. It is to be noted that the magnetic force of the magnetic body 16 so acts as to supplement the drive force of the rotor 15b in the closing direction with respect to the closing operation.

Figure 9:
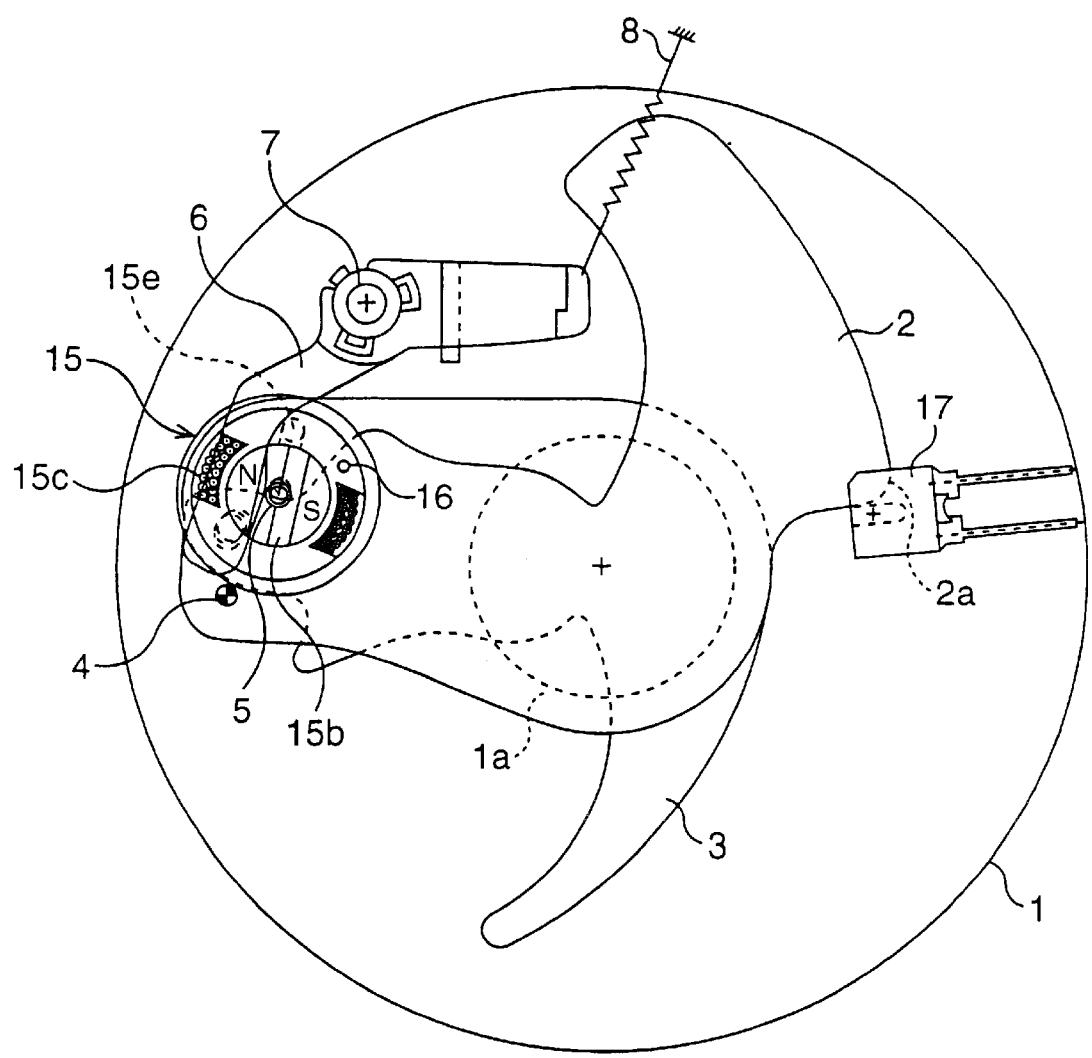
FIG. 9 is a plan view showing the shutter.
Figure 10:
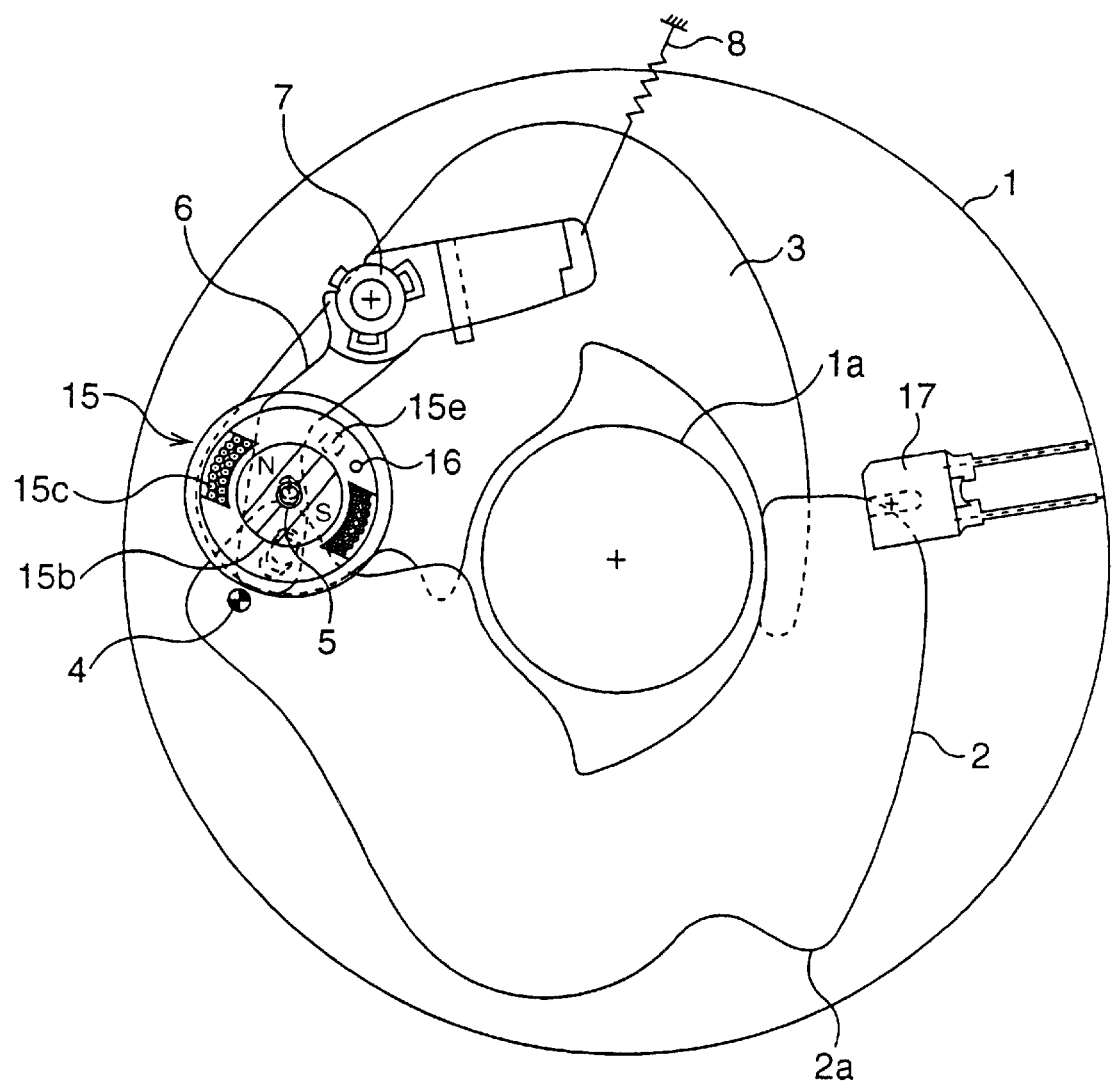
FIG. 10 is a plan view showing the shutter.
Figure 11:
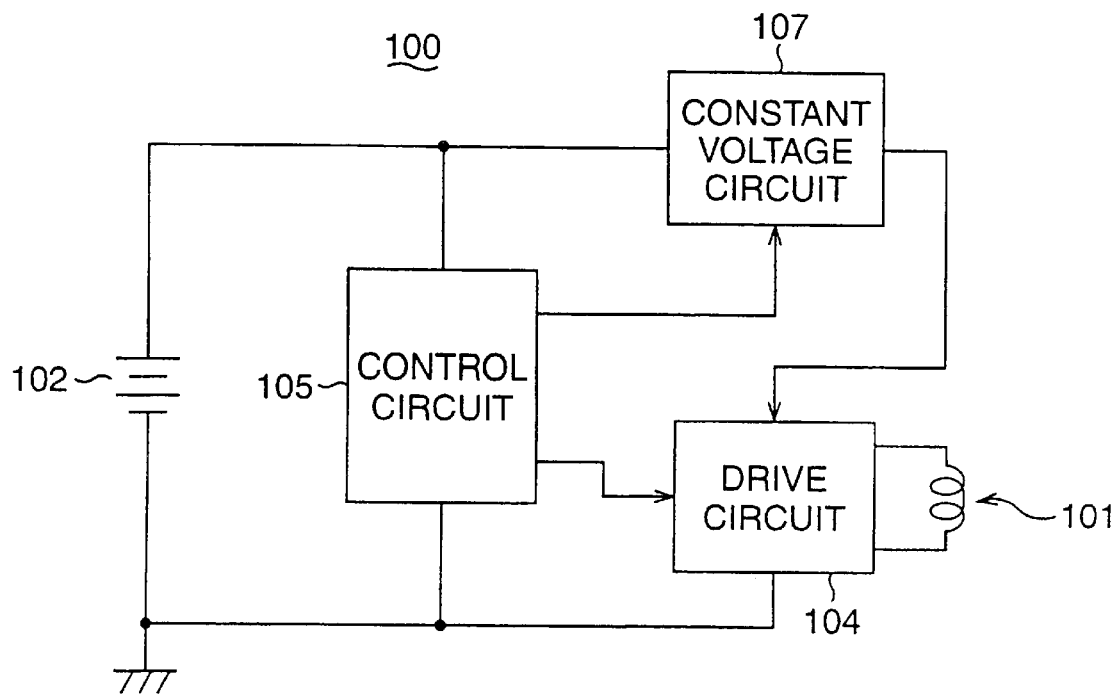
FIG. 11 is a block diagram showing an example of a prior art shutter control apparatus.
Figure 12:
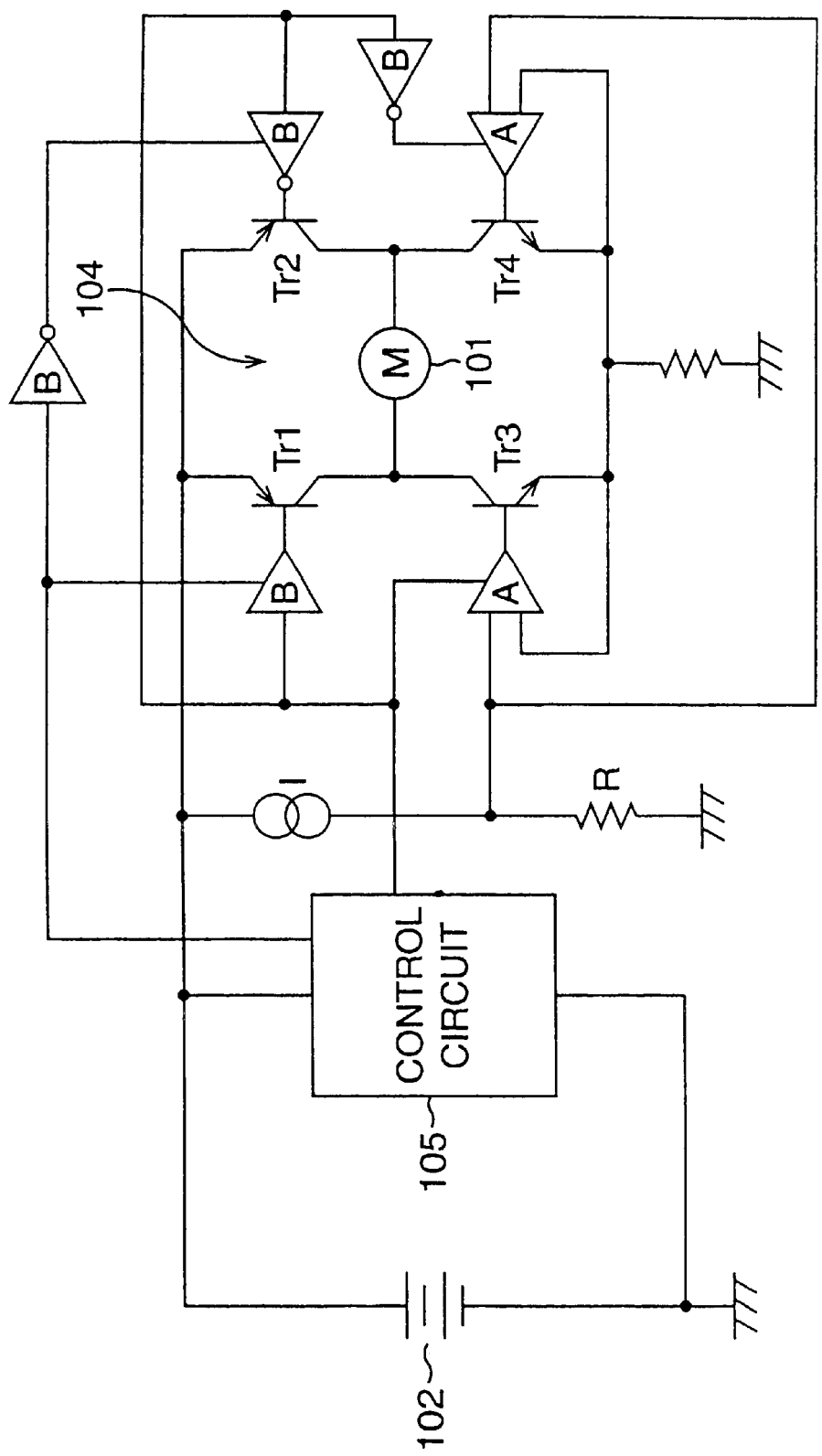
FIG. 12 is a block diagram showing another example of a prior art shutter control apparatus.

Another embodiment will now be described with reference to FIGS. 9 and 10, but like reference numerals denote like or corresponding parts to avoid tautological explanation. In this embodiment, the engagement lever 10, the closing spring 12 and the coupling lever 13 in the foregoing embodiment are omitted, and a photo sensor 17 is utilized instead of these members. In other words, when the motor 15 is not energized in the blade closing state, since the magnetic force of the magnetic body 16 causes the rotor 15b to slightly turn in the counterclockwise direction against the bias force of the opening spring 8, the opening/closing lever 6 is pushed by the drive pin 15e to be held at a position slightly distanced from the blade 2 (see FIG. 9). Even if the opening/closing lever 6 moves in a direction away from the blade 2, it is held at that position by the magnetic attractive force of the magnetic body 16. That is, since the magnetic attractive force of the magnetic force 16 is set to be greater than the bias force of the spring 8, the rotor 15b of the motor 15 does not rotate accidentally by, e.g., the impulse shock.

In case of operating the shutter blade to open in order to take a photograph, when the current flows through the coil 15c of the motor 15 from the rear face to the top face of the drawing (see FIG. 7), the rotor 15b prevails against the magnetic attractive force of the magnetic body 16 to turn in the clockwise direction, and the drive pin 15e slightly swivels in the same direction. Therefore, application of the pushing force to the opening/closing lever 6 is canceled so that the opening/closing lever 6 is turned in the counterclockwise direction by the opening spring 8. As a result, the blades 2 and 3 are operated to open to the position shown in FIG. 10.

Incidentally, since the revolving speed of the rotor 15b is sufficiently faster than that of the opening/closing lever 6, the force of the rotor 15b obtained due to the influence of the magnetic force of the magnetic body 16 does not act on the blade opening operation as a reactive force in any way in the blade opening operation.

Further, if the shutter blade is operated to close from the blade opening state, when the direction for energizing the motor 15 is reversed, the rotor 15b is turned in the counterclockwise direction, and the drive pin 15e pushes the opening/closing lever 6 at the opening position to be turned in the clockwise direction. When the blade reaches the closing position, energization of the motor 15 is shut off, and the opening/closing lever 6 is held at a position shown in FIG. 9 where the lever 6 is engaged with the drive pin 15e. It is to be noted that the magnetic force of the magnetic body 16 so acts as to supplement the drive force of the rotor 15b in the closing direction with respect to the closing operation.

As described above, according to the present invention, the drive circuit of the shutter control apparatus directly uses the power supply voltage to perform changeover between the power for opening drive and the power for closing drive to be supplied to the actuator. Consequently, the utilization efficiency of the power supply voltage fed from the battery can be improved. Further, when controlling the drive circuit by setting the timing for switching to the closing drive in accordance with the brightness information of an object, the timing for switching to the closing drive is corrected in accordance with a variation of the power supply voltage detected by the detection circuit. As a result, stabilization of the operation of the shutter blade can be attained. Therefore, the present invention can realize both enhancement of the efficiency and stabilization of the shutter control apparatus. In addition, the constant voltage circuit or the constant current circuit is not used for stabilization, which can contribute to reduction in the manufacturing cost or in the size of the apparatus.

What is claimed is:

1. A shutter control apparatus for executing an exposure operation of a camera to photograph an object by controlling an actuator which drives a shutter blade to be opened and closed, the shutter control apparatus comprising:

a battery that supplies a power supply voltage;

a detection circuit for detecting a variation of the power supply voltage;

a drive circuit that directly uses the power supply voltage to feed a power to the actuator, the drive circuit switching between an open power for opening the shutter blade and a closing power for closing the shutter blade;

a control circuit that controls the drive circuit by setting a timing for switching to the closing power in accordance with at least a brightness of an object; and a memory that stores a table indicating a relation between the power supply voltage and the timing for switching to the closing power, wherein the control circuit corrects the timing for switching to the closing power in response to a variation of the power supply voltage detected by the detection circuit by referencing to the table stored in the memory.

2. The shutter control apparatus according to claim 1, wherein the control circuit operates when the power supply voltage lowers by advancing the timing for switching to the closing power so as to compensate for a delay in the closing of the shutter blade due to reduction in the closing power caused by the lowering of the power supply voltage.

3. The shutter control apparatus according to claim 1, wherein the detection circuit detects the variation of the power supply voltage while the actuator is energized by the drive circuit before execution of the exposure operation.

4. The shutter control apparatus according to claim 1, wherein the control circuit controls an actuator for driving a shutter blade provided in a digital still camera.

5. A shutter control apparatus for executing an exposure operation of a camera to photograph an object by controlling an actuator which drives a shutter blade to be opened and closed, the shutter control apparatus comprising:

a battery that supplies a power supply voltage;

a detection circuit for detecting a variation of the power supply voltage;

a drive circuit that directly uses the power supply voltage to feed a power to the actuator, the drive circuit switching between an open power for opening the shutter blade and a closing power for closing the shutter blade; and a control circuit that controls the drive circuit by setting a timing for switching to the closing power in accordance with at least a brightness of an object, wherein the control circuit corrects the timing for switching to the closing power in response to the variation of the power supply voltage detected by the detection circuit, such that the control circuit operates when the power supply voltage drops for advancing the timing for switching to the closing power so as to compensate for a delay in the closing of the shutter blade due to reduction in the closing power caused by the drop of the power supply voltage.

6. The shutter control apparatus according to claim 5, wherein the detection circuit detects the variation of the power supply voltage while the actuator is energized by the drive circuit before execution of the exposure operation.

7. The shutter control apparatus according to claim 5, wherein the control circuit controls an actuator for driving a shutter blade provided in a digital still camera.

* * * * *